(12) United States Patent
Kim et al.

(10) Patent No.: US 8,644,846 B2
(45) Date of Patent: Feb. 4, 2014

(54) MOBILE DEVICE AND METHOD FOR PROVIDING ECO-FRIENDLY USER INTERFACE

(75) Inventors: Hyun Kyoung Kim, Seoul (KR); Won Lee, Seoul (KR); Kyoung Sik Yoon, Seongnam-si (KR); Sang Hyun Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 236 days.

(21) Appl. No.: 13/023,035

(22) Filed: Feb. 8, 2011

(65) Prior Publication Data
US 2011/0195723 A1 Aug. 11, 2011

(30) Foreign Application Priority Data
Feb. 11, 2010 (KR) .................. 10-2010-0012932

(51) Int. Cl.
*H04W 88/02* (2009.01)
(52) U.S. Cl.
USPC ....................................... 455/456.1; 455/566
(58) Field of Classification Search
USPC ........... 455/456.1, 566, 558; 307/23; 136/291
See application file for complete search history.

(56) References Cited

U.S. PATENT DOCUMENTS

| 2006/0184320 A1 | 8/2006 | Hong |
| 2008/0143291 A1 | 6/2008 | Lin et al. |
| 2011/0309676 A1* | 12/2011 | Terrell ............................ 307/23 |

FOREIGN PATENT DOCUMENTS

| KR | 10-2003-0049107 A | 6/2003 |
| KR | 10-2006-0080987 A | 7/2006 |
| KR | 10-2006-0090913 A | 8/2006 |
| KR | 10-0780438 B1 | 11/2007 |

* cited by examiner

*Primary Examiner* — Phuoc H Doan
(74) *Attorney, Agent, or Firm* — Jefferson IP Law, LLP

(57) ABSTRACT

Methods and mobile devices for providing various eco-friendly User Interfaces (UIs) are provided. In one method for providing the eco-friendly UI, the mobile device measures a recharging amount or time, displays the recharging amount or time, and determines whether the recharging amount or time is more than a predefined critical amount or time. If the recharging amount or time is more than the critical amount or time, the mobile device is transitioned into an executable state of a specific application. This may give a user motivation to use a solar charge system and thereby reduce battery consumption of the mobile device.

5 Claims, 12 Drawing Sheets

FIG. 3
(a)
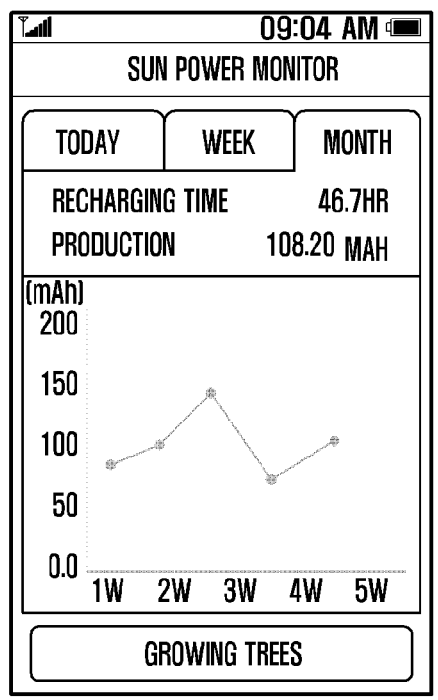
(b)
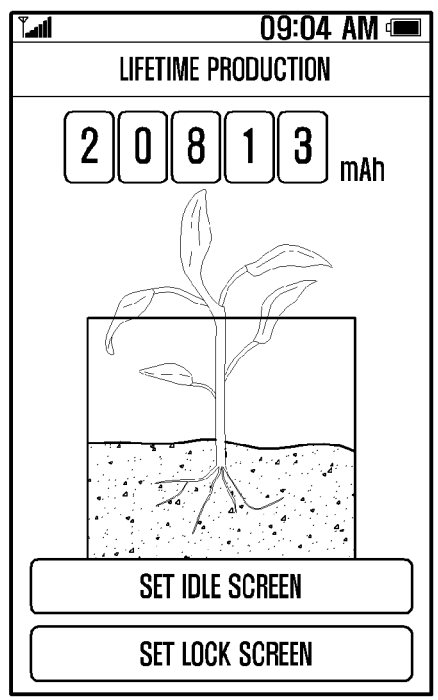

FIG. 5
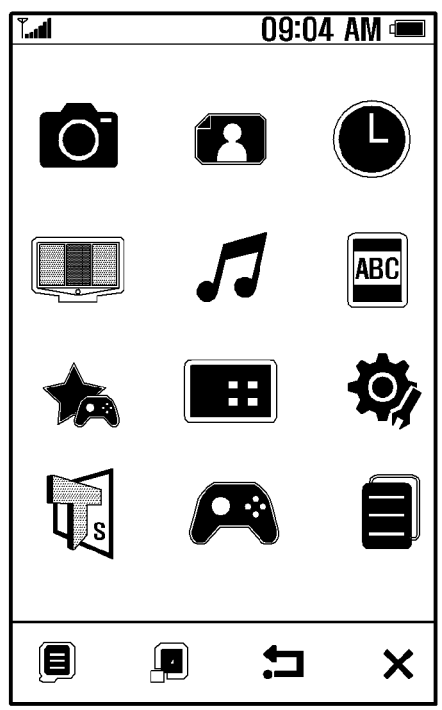
(a)
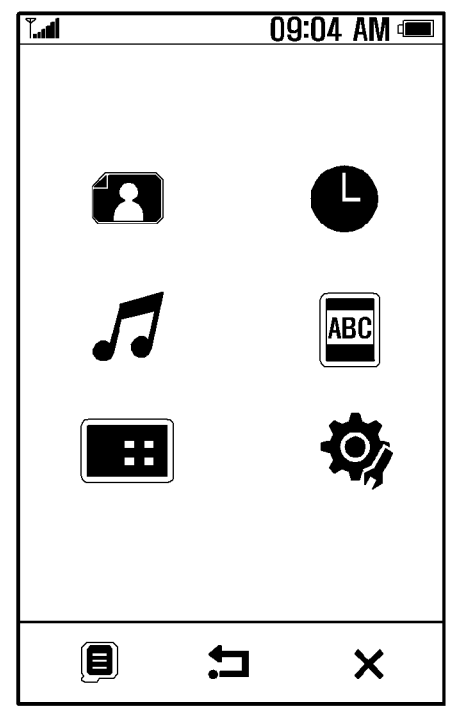
(b)

MOBILE DEVICE AND METHOD FOR PROVIDING ECO-FRIENDLY USER INTERFACE

PRIORITY

This application claims the benefit under 35 U.S.C. §119 (a) of a Korean patent application filed on Feb. 11, 2010 in the Korean Intellectual Property Office and assigned Serial No. 10-2010-0012932, the entire disclosure of which is hereby incorporated by reference.

BACKGROUND OF THE INVENTION

1. Field of the Invention

The present invention relates to a mobile device. More particularly, the present invention relates to a mobile device and method for providing an eco-friendly User Interface (UI).

2. Description of the Related Art

The term "eco-friendly" is used herein to describe activities which are good for the environment and is also referred to as environmentally friendly, nature friendly, or green. There are a range of ways in which activities can be eco-friendly, ranging from products which are constructed in an environmentally friendly way to making lifestyle changes which are designed to benefit the environment.

Meanwhile, with advancements in technology, mobile devices are increasing in popularity. It is therefore desirable that a mobile device motivates a user to behave in an eco-friendly manner.

SUMMARY OF THE INVENTION

An aspect of the present invention is to address at least the above-mentioned problems and/or disadvantages and to provide at least the advantages described below. Accordingly, an aspect of the present invention is to provide a mobile device and method for providing an eco-friendly User Interface (UI).

In accordance with an aspect of the present invention, a method for an eco-friendly UI of a mobile device is provided. The method includes measuring a recharging amount or time, displaying the recharging amount or time, determining whether the recharging amount or time is more than a predefined critical amount or time, and if the recharging amount or time is more than the critical amount or time, transitioning the mobile device into an executable state of a specific application.

In accordance with another aspect of the present invention, a method for providing an eco-friendly UI of a mobile device is provided. The method includes calculating a number of a user's steps, creating a virtual item according to the number of the user's steps, finding a current location of the mobile device, and displaying a virtual world map and displaying the virtual item at the current location in the virtual world map.

In accordance with another aspect of the present invention, a method for providing an eco-friendly UI of a mobile device is provided. The method includes finding a current location of the mobile device, sending a request for environmental information about the current location to a server, receiving the requested environmental information from the server, and displaying the received environmental information.

In accordance with another aspect of the present invention, a mobile device for providing an eco-friendly UI is provided. The mobile device includes an input unit, a display unit, a solar panel for receiving solar energy and for converting the solar energy into electrical energy for charging a battery, and a control unit for measuring a recharging amount or time of the battery charged by the solar panel, for enabling the display unit to display the recharging amount or time, and if the recharging amount or time is more than a predefined critical amount or time, for transitioning the mobile device into an executable state of a specific application.

In accordance with another aspect of the present invention, a mobile device for providing an eco-friendly UI is provided. The mobile device includes an input unit for creating a command for an entry into an eco mode, a display unit, and a control unit for receiving the command for an entry into the eco mode from the input unit and for enabling the display unit to increase a black portion of a currently displayed screen or to reduce the brightness of the screen view, while keeping the shape of the screen.

In accordance with another aspect of the present invention, a mobile device for providing an eco-friendly UI is provided. The mobile device includes an input unit, a display unit, and a control unit for executing several applications in a multitasking manner, and for enabling the display unit to display a list of the executed applications and to display battery consumption of each application in the list.

In accordance with another aspect of the present invention, a mobile device for providing an eco-friendly UI is provided. The mobile device includes an input unit, a display unit, a motion sensor unit for detecting the motion of the mobile device, a location-based communication module for receiving a signal about a current location of the mobile device, and a control unit for calculating the number of user's steps by controlling the motion sensor unit, for creating a virtual item according to the number of user's steps, for finding the current location of the mobile device by controlling the location-based communication module, and for displaying a virtual world map and for displaying the virtual item at the current location in the virtual world map by controlling the display unit.

In accordance with another aspect of the present invention, a mobile device for providing an eco-friendly UI is provided. The mobile device includes an input unit, a display unit, a radio frequency unit for transmitting and receiving data, a location-based communication module for receiving a signal about a current location of the mobile device, and a control unit for finding the current location of the mobile device by controlling the location-based communication module, for sending a request for environmental information about the current location to a server by controlling the radio frequency unit, for receiving the requested environmental information from the server, and for displaying the received environmental information by controlling the display unit.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 3 is a screen view illustrating an eco-friendly UI provided by the method in accordance with the first exemplary embodiment of the present invention;

FIG. 5 is a screen view illustrating another eco-friendly UI provided by the method in accordance with the second exemplary embodiment of the present invention;

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Furthermore, well known or widely used techniques, elements, structures, and processes may not be described or illustrated in detail to avoid obscuring the essence of the present invention. Although the drawings represent exemplary embodiments of the invention, the drawings are not necessarily to scale and certain features may be exaggerated or omitted in order to better illustrate and explain the present invention.

Although a mobile device will be exemplarily described hereinafter, the present invention is not limited to the mobile device. Alternatively, the present invention may be applied to any other electronic device having a display unit. For example, the mobile device according to exemplary embodiments of the present invention may include a mobile communication terminal, a Portable Multimedia Player (PMP), a Personal Digital Assistant (PDA), a smart phone, a Moving Picture Experts Group (MPEG)-1 or MPEG-2 Audio Layer 3 (MP3) player, and the like.

Figure 1:
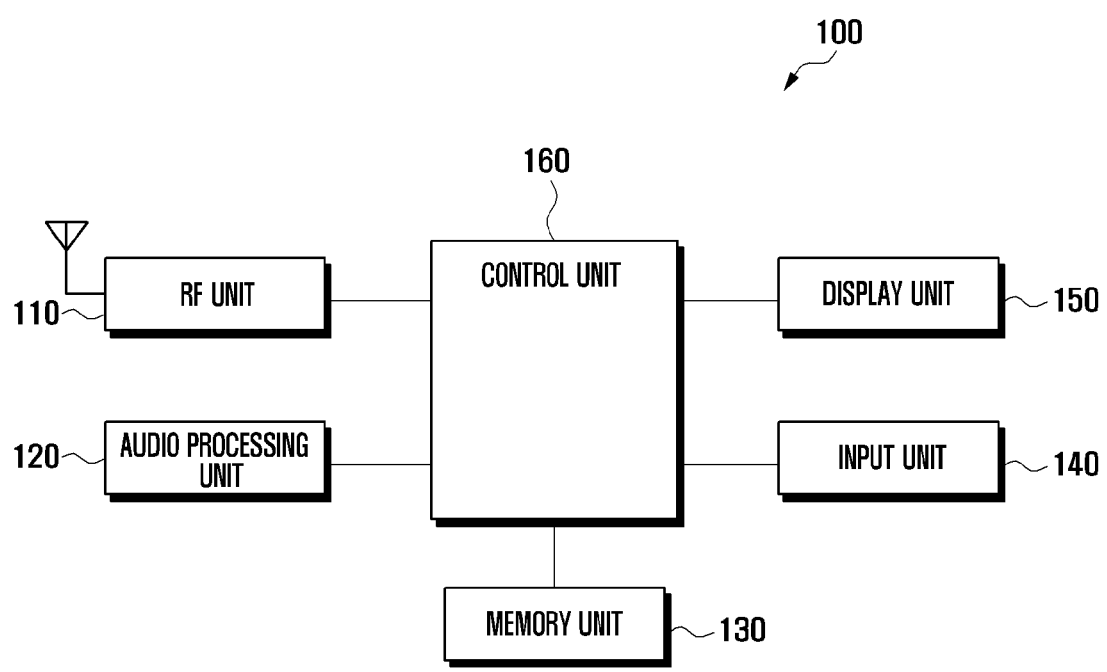
FIG. 1 is a block diagram illustrating a configuration of a mobile device in accordance with an exemplary embodiment of the present invention.

FIG. 1 is a block diagram illustrating a configuration of a mobile device in accordance with an exemplary embodiment of the present invention.

Referring to FIG. 1, a mobile device 100 includes a Radio Frequency (RF) unit 110, an audio processing unit 120, a memory unit 130, an input unit 140, a display unit 150, and a control unit 160.

The RF unit 110 performs a function to transmit and receive data for wireless communication of the mobile device 100. Typically, the RF unit 110 may include an RF transmitter that up-converts the frequency of an outgoing signal and amplifies the signal, an RF receiver that amplifies an incoming signal with low-noise and down-converts the frequency of the signal, and the like. Additionally, the RF unit 110 may receive data through a wireless channel and output the data received from the wireless channel to the control unit 160, and may receive data from the control unit 160 and transmit the data from the control unit 160 through a wireless channel.

The audio processing unit 120 may include a codec which may be composed of a data codec for processing packet data and an audio codec for processing an audio signal such as a voice. The audio processing unit 120 converts a digital audio signal into an analog audio signal through the audio codec and outputs the analog audio signal through a speaker (SPK), and convents an analog audio signal received from a microphone (MIC) into a digital audio signal through the audio codec.

The memory unit 130 stores programs and data required for operations of the mobile device 100 and may consist of a program region and a data region. The memory unit 130 may be formed of a volatile memory, a nonvolatile memory, or a combination thereof. The volatile memory may include a semiconductor memory such as Dynamic Random Access Memory (DRAM) or Static Random Access Memory (SRAM), and the nonvolatile memory may include a hard disk.

The input unit 140 receives a user's key manipulation for controlling the mobile device 100, creates a related input signal, and delivers the input signal to the control unit 160. The input unit 140 may be formed of a keypad, such as a 3*4 keypad or a QWERTY keypad, which has alphanumeric keys and navigation keys. Alternatively or additionally, the input unit 140 may be formed of a touchpad.

The display unit 150 may be formed of a Liquid Crystal Display (LCD), an Organic Light Emitting Diode (OLED), an Active Matrix OLED (AMOLED) or any other equivalent. The display unit 150 visually offers a menu, input data, function setting information and any other various information of the mobile device 100 to a user. The display unit 150 performs a function to output a booting screen, an idle screen, a menu screen, a call screen, or any other application screens of the mobile device 100.

More particularly, the mobile device 100 may further include a solar photovoltaic panel (not shown), a motion sensor unit (not shown), and a location-based communication module (not shown).

The solar photovoltaic panel generates electric power by converting solar radiation into direct current electricity in order to charge a battery of the mobile device 100. The solar photovoltaic panel is arranged on one or more sides of the mobile device 100.

The motion sensor unit may be formed of an acceleration sensor, a gyro sensor, a geomagnetic sensor, and the like. The motion sensor unit detects a user's motion made against the mobile device 100, creates a motion detection signal, and delivers the motion detection signal to the control unit 160. For instance, if the motion sensor unit is formed of the acceleration sensor, the motion detection signal includes data about changes in acceleration. The control unit 160 recognizes a user's motion through the motion detection signal and performs a corresponding function.

The location-based communication module receives and transmits a signal required for determining information about a current location of the mobile device 100. The location-based communication module may include a Global Positioning System (GPS) module, a Bluetooth communication module, an Infrared communication module, a Zigbee communication module, a WIFI communication module, and the like.

If formed of the GPS module, the location-based communication module receives GPS signals from GPS satellites and sends the GPS signals to the control unit 160. Then the control unit 160 determines a current location of the mobile device 100 through the GPS signals. If formed of the Bluetooth communication module, the Infrared communication module, or the Zigbee communication module, the location-based communication module establishes a communication channel with another communication module located in the vicinity and sends information about the established channel to the control unit 160. Then the control unit 160 ascertains a communication module on the other end of the channel and determines a rough location of the mobile device 100. If formed of the WIFI communication module, the location-based communication module connects with a neighboring Access Point (AP) and sends information about the connected AP to the control unit 160. Then the control unit 160 ascertains the connected AP and determines a rough location of the mobile device 100.

The control unit 160 performs a function to control all of the operations of the mobile device 100. According to an exemplary embodiment of the present invention, the control unit 160 measures recharging amount or time of the battery which is charged by the solar photovoltaic panel, and controls the display unit 150 to display the measured amount or time thereon. If the measured amount or time is more than a predefined critical amount or time, the control unit 160 transitions the state of the mobile device into an executable state of a specific application.

When a power-off command is inputted through the input unit 140, the control unit 160 checks a current level of the battery and turns off the power. Additionally, when a power-on command is inputted through the input unit 140, the control unit 160 turns on the power and checks a current level of the battery. Then the control unit 160 measures the recharging amount or time of the battery by comparing a battery level determined before the power-off with a battery level checked after the power-on.

In another exemplary embodiment of the present invention, the control unit 160 receives instructions to enter into an eco mode of the mobile device from the input unit 140 and controls the display unit 150 to be adapted to the eco mode. More specifically, in the eco mode, the display unit 150 may increase a black portion of a currently displayed screen view or may reduce the brightness of the screen view, while keeping the shape of the screen view. Alternatively, in a case where the screen view contains several icons displayed thereon, the display unit 150 may omit parts of icons from the screen view or may change the shape of each icon from a full image to an outlined image.

In this exemplary embodiment, the display unit 150 may display a specific icon used for an entry into the eco mode. When such an icon is selected through the input unit 140, the control unit 160 determines that instructions to enter into the eco mode are inputted. Alternatively, when receiving a particular command to enter into a specific screen view defined as the eco mode through the input unit 140, the control unit 160 may determine that instructions to enter into the eco mode are inputted.

In still another exemplary embodiment of the present invention, the control unit 160 executes several applications in a multi-tasking manner. In this case, the control unit 160 enables the display unit 150 to display a list of applications and to display battery consumption of each application in the list. Additionally, the control unit 160 enables the display unit 150 to display an icon for quitting each or all of executed applications and to display an icon for an entry into a battery check menu. Furthermore, the control unit 160 enables the display unit 150 to display different colors or animation images with different speeds for respective applications according to battery consumption. Also, if the icon for an entry into the battery check menu is selected through the input unit 140, the control unit 160 enables the display unit 150 to display a list of executable applications and battery consumption of each application. In the battery check menu screen, the control unit 160 enables the display unit 150 to display application quit icons for the currently executed applications among executable applications.

In still another exemplary embodiment of the present invention, the control unit 160 calculates the number of user's steps by using the motion sensor unit and creates a virtual item depending on the number of user's steps. In addition, the control unit 160 finds a current location of the mobile device 100 by using the location-based communication module and enables the display unit 150 to display a virtual world map and to display a virtual item at the current location in the virtual world map.

In still another exemplary embodiment of the present invention, the control unit 160 finds a current location of the mobile device 100 by using the location-based communication module, sends a request for environmental information about the current location to a server through the RF unit 110, receives the requested environmental information, and displays the requested environmental information on the display unit 150. Also, the control unit 160 classifies the environmental information according to at least one regional level and displays such regional levels on the display unit 150. If one of regional levels is selected, the control unit 160 enables the display unit 150 to display the environmental information about the selected regional level.

Described hereinafter is a method for providing an eco-friendly User Interface (UI) of the mobile device 100 discussed above. Five exemplary embodiments in connection with such methods are fully discussed.

A first exemplary embodiment of the present invention relates to a method for providing a user interface that gives a user motivation to frequently use a solar charge system. This exemplary embodiment is described below with reference to FIG. 2 as being applied to the mobile device 100, which has solar charge capabilities.

Figure 2:
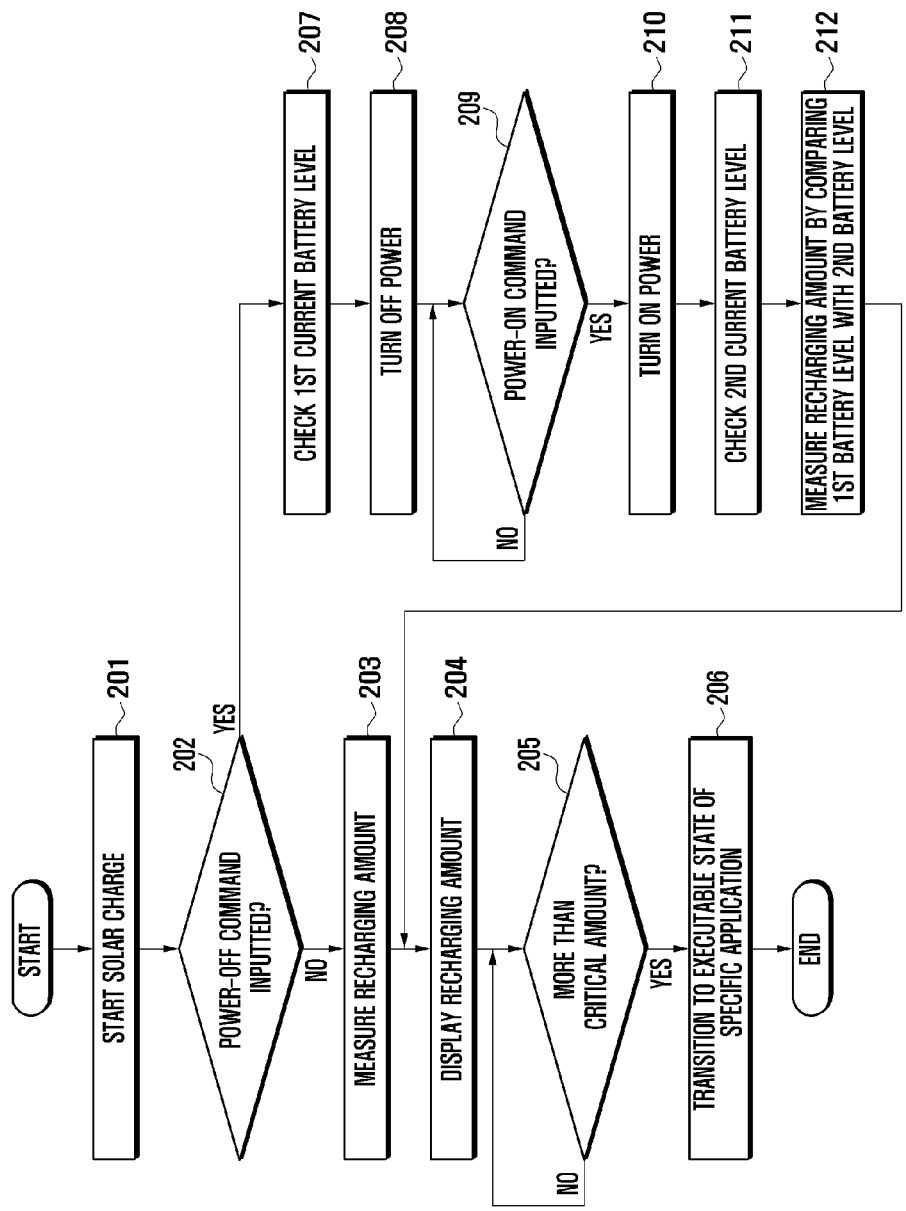
FIG. 2 is a flow diagram illustrating a method for providing an eco-friendly User Interface (UI) in accordance with a first exemplary embodiment of the present invention.

FIG. 2 is a flow diagram illustrating a method for providing an eco-friendly UI in accordance with the first exemplary embodiment of the present invention. In the first exemplary embodiment, the mobile device 100 has implemented therewith the solar photovoltaic panel discussed above.

Referring to FIGS. 1 and 2, the solar panel (not shown) starts a solar charge in step 201. That is, the solar panel receives solar energy and converts the solar energy into electrical energy to charge a battery. Then the control unit 160 determines whether a power-off command is inputted through the input unit 140 in step 202. If no power-off command is inputted, the control unit 160 measures a recharging amount in step 203 and enables the display unit 150 to display the recharging amount in step 204.

In this exemplary embodiment, the recharging amount may be represented using a 'mAh' or 'W' unit. Alternatively, the recharging amount may be represented as a fossil fuel (e.g., coal or oil) image or a tree image. Also, a fossil fuel image or a tree image may be expressed together with the amount of fossil fuel or trees which can be conserved by performing a solar charge. For instance, in a case of a coal image, the amount of fossil fuel may be expressed using a weight unit such as gram or kilogram. In a case of an oil image, the amount of fossil fuel may be expressed using a volume unit such as milliliter or liter. The amount of trees may be expressed using a weight unit, a volume unit or the number of trees.

The recharging amount may be represented by the day, week, month or year. The control unit 160 may record a cumulative recharging amount that has been added after the launch of the mobile device 100. If a reset function is available, the control unit 160 may restart recording a cumulative recharging amount after receiving a reset command through the input unit 140.

In an alternative exemplary embodiment of the present invention, the control unit 160 may measure a recharging time instead of the recharging amount in the step 203 and may enable the display unit 150 to display the recharging time in the step 204. The recharging time may be represented using a time unit such as hour, minute or second.

Next, the control unit 160 determines whether the measured recharging amount is more than a predefined critical amount stored in the memory unit 130 in step 205. The predefined critical amount corresponds to the condition that the control unit 160 executes a specific application which may be an eco-friendly program stored in the memory unit 130. Such a specific application is set to be executed when the recharging amount satisfies a given condition.

If the measured recharging amount is more than the predefined critical amount, the control unit 160 transitions the state of the mobile device 100 into an executable state of a specific application in step 206. For instance, a specific application may be an item fostering application, and an item may be a tree, a flower, or the like. The control unit 160 executes the item fostering application and enables the display unit 150 to display a seed or root image. During a solar charge, the control unit 160 measures the recharging amount and thereby changes a displayed item. For instance, under the control of the control unit 160, the display unit 150 continuously displays a process of growth from a seed or root into a tree or flower.

In a certain exemplary embodiment, two or more critical amounts may be stored in the memory unit 130. In this case, the control unit 160 measures the recharging amount and, if the measured amount reaches the first critical amount, transitions the state of the mobile device 100 into an executable state of a specific application. Then if the measured amount reaches the second critical amount, the control unit 160 creates a new item and displays it on the display unit 150. For instance, when the measured amount reaches the second critical amount, the control unit 160 enables the display unit 150 to further display a new root image near a growing tree image. Also, whenever the measured amount reaches another critical amount, the control unit 160 may continuously create a new item and display it on the display unit 150. As a result, several trees can be displayed together on the display unit 150. Alternatively, whenever the measured amount reaches another critical amount, the control unit 160 may remove a displayed image from the display unit 150 and replace it with a new one. For instance, when the measured amount reaches the second critical amount, the control unit 160 may remove an existing tree image and display a fossil fuel image.

In a certain exemplary embodiment, the recharging amount may be converted into a point and used as a mean of payment for a content purchase. In this case, the control unit 160 enables the RF unit 110 to access a content providing server and transmits data about a cumulative recharging amount to the content providing server. Then the content providing server converts the received data into a corresponding point and returns it to the mobile device 100. So, a user of the mobile device 100 can purchase desired content with the received point. Preferably, purchasable content may be eco-friendly content such as a tree or flower image or eco-related music content.

Meanwhile, if a power-off command is inputted in the step 202, the control unit 160 checks a current battery level in step 207 and turns off the power in step 208. Next, the control unit 160 determines whether a power-on command is inputted through the input unit 140 in step 209. If a power-on command is inputted, the control unit 160 turns on the power in step 210 and checks a current battery level in step 211. Also, the control unit 160 measures a recharging amount by comparing a battery level checked before power-off with a battery level checked after power-on in step 212. Thereafter, the control unit 160 performs the step 204 in order to display the measured recharging amount by controlling the display unit 150.

FIG. 3 is a screen view illustrating an eco-friendly UI provided by the method in accordance with the first exemplary embodiment of the present invention.

Referring to FIG. 3, screen view [a] exemplarily shows the representation of the recharging amount. As shown, this screen view offers a menu in which a user can monitor the recharging amount by the day, week and month. This screen view displays the recharging time using 'hour' as a unit as well as the recharging amount (expressed as 'production' in the drawing) using 'mAh' as a unit. Also, this screen view further displays a graph that shows variations of the recharging amount by the week in a given month. In addition, this screen view further displays an icon 'growing trees' which corresponds to an execution icon of a tree fostering application. This icon 'growing trees' may not appear until the recharging amount reaches a predefined critical amount. This icon 'growing trees' indicates that the mobile device 100 is turned to the state capable of executing the tree fostering application.

In FIG. 3, screen view [b] exemplarily shows an execution screen of the tree fostering application. As shown, this screen view includes a numeral value of the recharging amount and a tree growing image. During a solar charge, the control unit 160 checks the recharging amount and, based thereon, changes the numeral value of the recharging amount and the shape of the tree growing image. Also, this screen view displays a 'set idle screen' icon and a 'set lock screen' icon. The 'set idle screen' icon corresponds to an icon for setting the idle screen to the execution screen of the tree fostering application. The 'set lock screen' icon corresponds to an icon for setting the lock screen to the execution screen of the tree fostering application. These icons allow a user to directly change the idle screen or the lock screen without entering into a 'screen set menu'. If the execution screen of the tree fostering application is set as the idle screen, a user can always see a current value of the recharging amount and a real-time tree growing image.

As discussed heretofore, the mobile device 100 according to the first exemplary embodiment of the present invention may offer a sensible feedback to a user, depending on the recharging amount or time. This may give a user a motivation to often use a solar charge system.

A second exemplary embodiment of the present invention relates to a method for providing a user interface that allows the mobile device 100 to reduce power consumption. This exemplary embodiment is applied to the mobile device 100 having an eco mode that is set to reduce power consumption in comparison with a normal mode.

The control unit 160 determines whether a command to enter into the eco mode is inputted from the input unit 140. In one case, the control unit 160 may output an icon for an entry into the eco mode on the display unit 150 and determine whether that icon is selected through the input unit 140. In this case, the input unit 140 may be formed of a touch panel. In another case, when the input unit 140 has a function key used for an entry into the eco mode, the control unit 160 may determine whether that key is selected through the input unit 140.

In a case where the idle screen, the menu screen, the application screen, etc. are composed of several faces, one of the faces may be set for the eco mode screen. In this case, the control unit 160 enables the display unit 150 to display one of several faces composing such a screen and determines whether a command to enter into the eco mode is inputted from the input unit 140. If the input unit 140 and the display unit 150 are formed of a touch screen and if a user inputs a touch-based given action (e.g., a drag or flick) on the touch screen, the control unit 160 may change a displayed screen. If the inputted action instructs an entry into the eco mode, the control unit 160 displays the eco mode screen on the display unit 150 and transitions the mobile device 100 into the eco mode.

After the mobile device 100 is turned to the eco mode, the control unit 160 may increase a black portion of a currently displayed screen as compared to that in the normal mode. Normally, color used in the screen may affect power consumption. That is, black consumes the lowest power, and power consumption is increased in the order of green, red, blue and white. The memory unit 130 stores different color information about the same screen, depending on the normal mode and the eco mode. In the eco mode, the control unit 160 retrieves corresponding color information from the memory unit 130 and applies it to the display unit 150.

Figure 4:
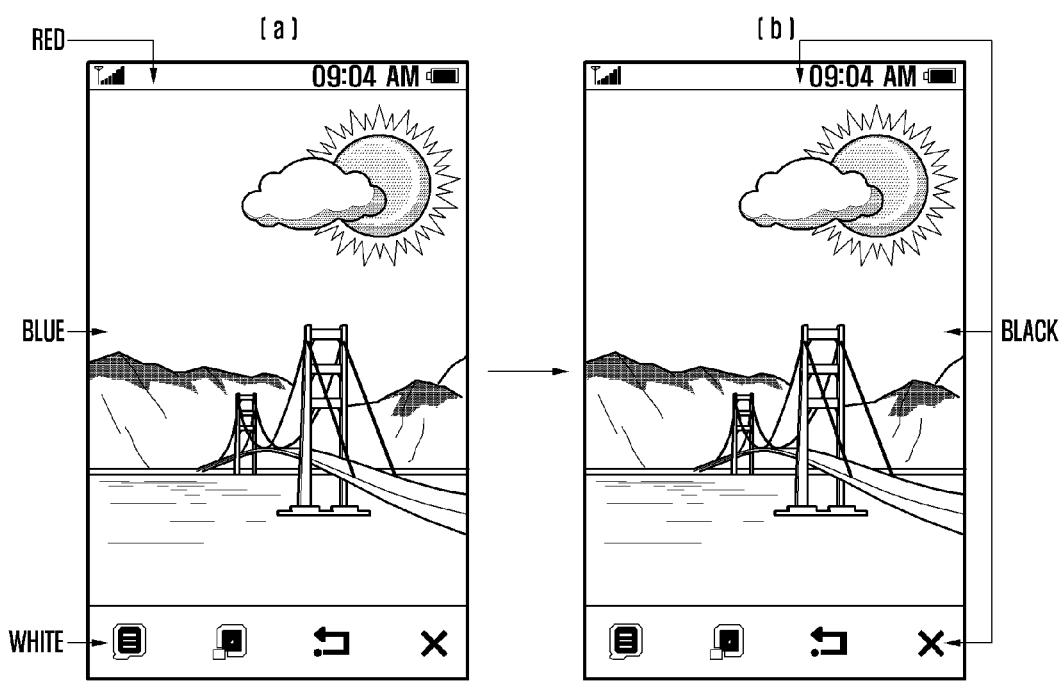
FIG. 4 is a screen view illustrating an eco-friendly UI provided by a method in accordance with a second exemplary embodiment of the present invention.

FIG. 4 is a screen view illustrating an eco-friendly UI provided by a method in accordance with the second exemplary embodiment of the present invention.

Referring to FIG. 4, screen view [a] shows a background screen in the normal mode. This background screen is composed chiefly of red, blue and white. On the other hand, screen view [b] of FIG. 4 shows a background screen in the eco mode which is composed chiefly of black. The control unit 160 enables the display unit 150 to display a relatively increased black portion of the screen in the eco mode, thus reducing power consumption.

Alternatively, the control unit 160 may reduce the brightness of the screen. Normally, the brightness of the screen may affect power consumption. That is, the higher brightness consumes more power. In this case, the memory unit 130 stores different brightness information about the same screen, depending on the normal mode and the eco mode. In the eco mode, the control unit 160 retrieves corresponding brightness information from the memory unit 130 and applies it to the display unit 150.

Also, the control unit 160 may offer fewer icons to the display unit 150 in the eco mode than those offered in the normal mode. Normally the number of icons displayed on the screen may affect power consumption. That is, the fewer icons consume much less power. In this case, the memory unit 130 stores different icon number or arrangement information about the same screen, depending on the normal mode and the eco mode. In the eco mode, the control unit 160 retrieves corresponding icon number or arrangement information from the memory unit 130 and applies it to the display unit 150.

FIG. 5 is a screen view illustrating another eco-friendly UI provided by the method in accordance with the second exemplary embodiment of the present invention.

Referring to FIG. 5, screen view [a] shows a menu screen in the normal mode. This menu screen contains sixteen icons. On the other hand, screen view [b] of FIG. 5 shows a menu screen in the eco mode which contains nine icons. The control unit 160 enables the display unit 150 to display relatively fewer icons in the eco mode, thus reducing power consumption.

Also, the control unit 160 may change the shape of each icon from a full image to an outlined image in the eco mode. Normally the outlined image (i.e., an empty image surrounded with a line) may consume less power than the full image. In this case, the memory unit 130 stores both a full image and an outlined image for the same image, depending on the normal mode and the eco mode. In the eco mode, the control unit 160 retrieves the outlined image from the memory unit 130 and applies it to the display unit 150.

Figure 6:
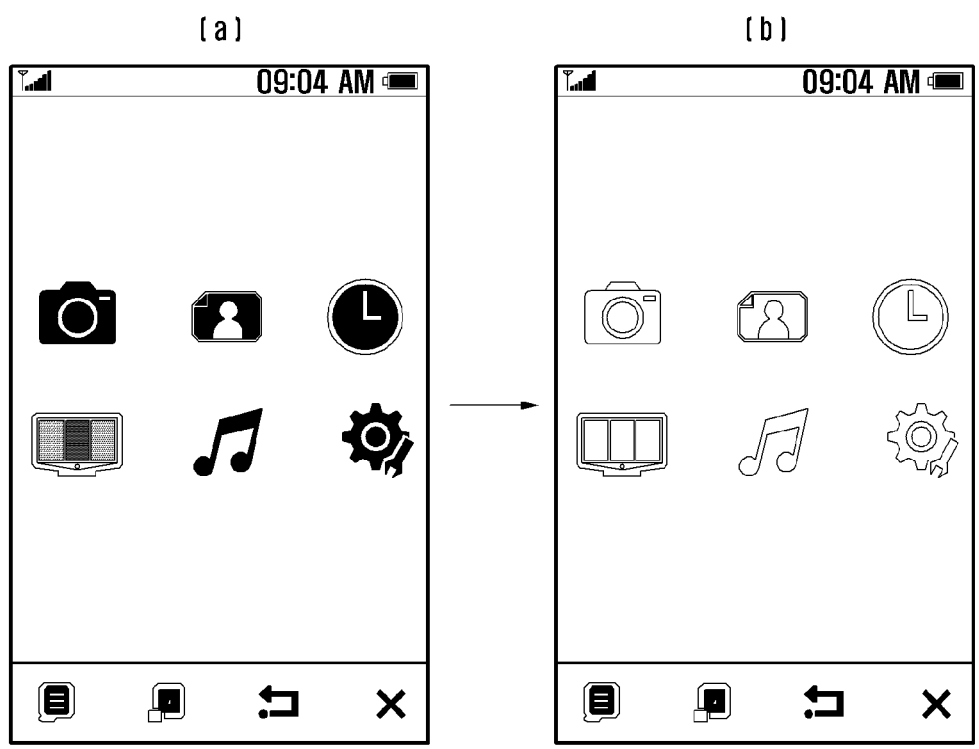
FIG. 6 is a screen view illustrating still another eco-friendly UI provided by the method in accordance with the second exemplary embodiment of the present invention.

FIG. 6 is a screen view illustrating still another eco-friendly UI provided by the method in accordance with the second exemplary embodiment of the present invention.

Referring to FIG. 6, screen view [a] shows a menu screen in the normal mode. This menu screen contains icons each of which is formed of a full image. On the other hand, screen view [b] of FIG. 6 shows a menu screen in the eco mode which contains icons formed of outlined images. The control unit 160 enables the display unit 150 to change the shape of each icon from the full image to the outlined image in the eco mode, thus reducing power consumption.

Meanwhile, if the mobile device 100 enters into the eco mode while several applications are being executed in a multi-tasking manner, the control unit 160 may quit one or more of the executed applications. Here, the quitted applications may be higher power-consuming applications or predefined applications. In a certain exemplary embodiment, the mobile device 100 may have an eco mode set menu which may contain a menu item for selecting applications to be quitted in the eco mode. Therefore, by using such a menu, a user can select at least one application to be quitted in the eco mode. Selected data is stored in the memory unit 130. When receiving a command to enter into the eco mode from the input unit 140, the control unit 160 retrieves the stored data from the memory unit 130 and, based thereon, quits the selected applications.

Additionally, in a case where the mobile device 100 has two or more communication modules, the control unit 160 may quit one or more of the running modules in the eco mode. More specifically, the mobile device 100 may have a Bluetooth communication module, a WIFI communication module, a GPS communication module, and the like. In this case, if the mobile device 100 enters into the eco mode, the control unit 160 may selectively quit the running communication modules. Here, the quitted modules may be higher power-consuming modules or predefined modules. The eco mode set menu may contain a menu item for selecting communication modules to be quitted in the eco mode. Therefore, by using such a menu, a user can select at least one communication module to be quitted in the eco mode. Selected data is stored in the memory unit 130. When receiving a command to enter into the eco mode from the input unit 140, the control unit 160 retrieves the stored data from the memory unit 130 and, based thereon, quits the selected modules.

As discussed heretofore, the mobile device 100 according to the second exemplary embodiment of the present invention may offer a user interface adapted to an entry into the eco mode with lower power consumption. The user interface for an entry into the eco mode is offered in a frequently used screen such as the idle screen or the menu screen and induces a user to select the eco mode. Power consumption will be reduced as the mobile device 100 remains in the eco mode.

A third exemplary embodiment of the present invention relates to a method for providing a user interface that allows the mobile device 100 to reduce power consumption. This exemplary embodiment is applied to the mobile device 100 having a battery check menu by which battery consumption for each application is offered to a user.

In this exemplary embodiment, the control unit 160 determines whether the battery check menu is selected through the input unit 140. In one case, the control unit 160 may output an icon for an entry into the battery check menu on the display unit 150 and determine whether that icon is selected through the input unit 140. In this case, the input unit 140 may be formed of a touch panel. In another case, when the input unit 140 has a function key used for an entry into the battery check menu, the control unit 160 may determine whether that key is selected through the input unit 140.

If the mobile device 100 executes a single application, the control unit 160 may enable the display unit 150 to display an icon for an entry into the battery check menu on the application execution screen. If the mobile device 100 executes two or more applications in a multi-tasking manner, the control unit 160 may enable the display unit 150 to display an icon for an entry into the battery check menu on the execution screen of one of the applications or on a multi-tasking application menu screen. Here, the multi-tasking application menu screen displays a list of currently executed applications each of which can be represented as text, an icon or a reduced execution screen.

When receiving a user's selection of the battery check menu from the input unit 140, the control unit 160 enables the display unit 150 to display a battery check menu screen. The battery check menu screen is composed of a list of executable applications and battery consumption for each application. The battery consumption may be represented as a numeral or image. In the former case, the numeral of the battery consumption may indicate the amount or percentage of consumed power for each application. In the latter case, the image of the battery consumption may use a bar, gradation, etc. Depending on the amount of consumed power, the image may be varied in size, length and color.

The control unit 160 may enable the display unit 150 to display an application quit icon in the battery check menu. Here, such application quit icons may be displayed only for the currently executed applications among executable applications. By doing so, a user can know the executed applications through the battery check menu screen and can directly quit any application.

Alternatively, the control unit 160 may enable the display unit 150 to display the battery check menu screen composed of a list of currently executed applications and battery consumption for each application.

Also, the control unit 160 may enable the display unit 150 to display the battery consumption or corresponding image on the application execution screen or on the multi-tasking application menu screen. In this case, the control unit 160 may classify the levels of battery consumption and define the color of each level. Then the control unit 160 may enable the display unit 150 to express an indicator region (in which the application name is entered) of the application execution screen as different colors according to the level of the battery consumption. For instance, the control unit 160 may define four levels of the battery consumption and assign red, orange, yellow and green to the four levels, respectively. That is, if the battery consumption of a certain application is in the first level, the control unit 160 enables the display unit 150 to display the indicator region with red.

In a case of the multi-tasking application menu screen being composed of reduced execution screens, the control unit 160 may enable the display unit 150 to display the indicator region with different colors according to the battery consumption. For instance, if a music application, a web browser application, a messenger application and a contact history application are being executed and if these applications have the second, first, third and fourth levels of battery consumption, respectively, the indicator regions of these applications are displayed with orange, red, yellow and green.

In another case, the control unit 160 may classify the levels of battery consumption and define an animation speed of each level. Then the control unit 160 may enable the display unit 150 to express an animation image with different speeds according to the level of the battery consumption when displaying the application execution screen or the multi-tasking application menu screen. Here, the animation image may be a certain dynamic image such as a rotating pinwheel image or a running man image. For instance, in a case of the multi-tasking application menu screen composed of reduced execution screens, the control unit 160 may enable the display unit 150 to display the rotating pinwheel image on each reduced execution screen and vary a rotating speed of the pinwheel according to the battery consumption.

Also, the control unit 160 may enable the display unit 150 to display an icon for quitting all executed applications on the multi-tasking application menu screen. This allows a simultaneous quick end of executed applications and hence reduces the battery consumption.

Figure 7:
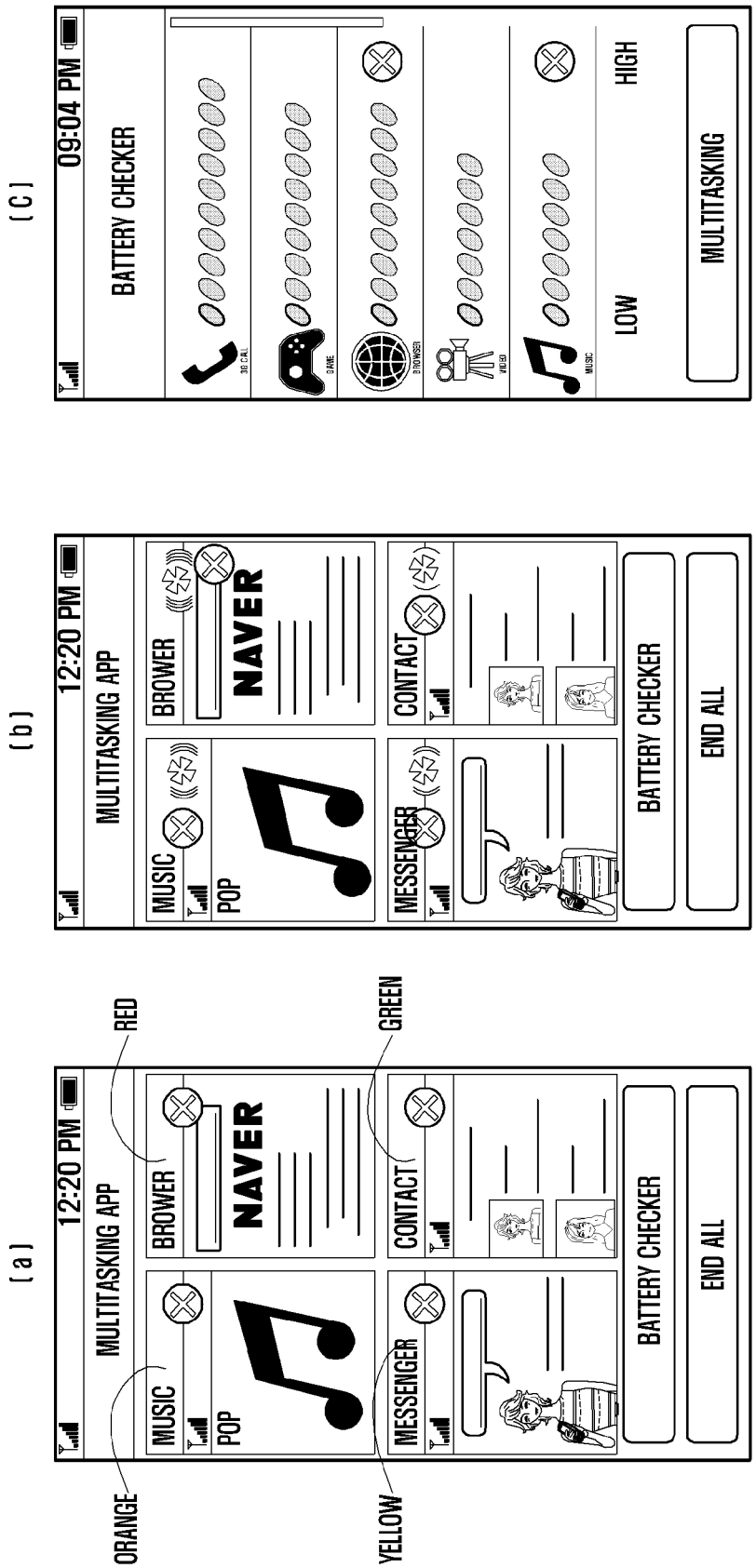
FIG. 7 is a screen view illustrating an eco-friendly UI provided by a method in accordance with a third exemplary embodiment of the present invention.

FIG. 7 is a screen view illustrating an eco-friendly UI provided by a method in accordance with the third exemplary embodiment of the present invention.

Referring to FIG. 7, screen view [a] shows a multi-tasking application menu screen. As shown, 'music', 'browser', 'messenger' and 'contact' applications are being executed and are displayed with reduced execution screens. In this screen view, the indicator regions of these applications are displayed with different colors. More specifically, the indicator region of the 'music' application is displayed with orange, the indicator region of the 'browser' application is displayed with red, the indicator region of the 'messenger' application is displayed with yellow, and the indicator region of the 'contact' application is displayed with green. As discussed above, each color indicates a distinct level of the battery consumption of each application. If the level of the battery consumption becomes higher in the order of red, orange, yellow and green, a user can know that the 'browser' application consumes the greatest battery.

Screen view [a] further includes the quit icon for each application. If any quit icon is selected, the control unit 160 quits the execution of a selected application. Also, this screen view further includes an 'end all' icon used for quitting all applications being executed in a multi-tasking manner. This icon allows a simultaneous quick end of all applications without requiring individual quit inputs in the multi-tasking application menu screen, thus reducing the battery consumption.

In FIG. 7, screen view [b] shows another example of the multi-tasking application menu screen. As shown, an animation image like a pinwheel is displayed for each application. A rotating speed of this pinwheel image is expressed. As shown, rotating speeds are decreased in the order of 'browser', 'music', 'messenger' and 'contact' applications. Depending on the rotating speeds, a user can know that the battery consumption of the 'browser' application is the highest and that of the 'contact' application is the lowest.

In FIG. 7, screen view [c] shows a battery check menu screen which is composed of a list of applications and battery consumption for each application. The battery consumption may be represented as equally sized and shaped images arranged in a row. The color of the images may be changed as the number of the images arranged in a row increases. In this screen view, applications are disposed in a list according to battery consumption. Therefore, a user can know through the battery check menu screen that a '3G call' application consumes the highest battery. Also, an application quit icon is offered to 'browser' and 'music' applications. Therefore, a user can know that the 'browser' and 'music' applications are currently executed, and can quit immediately a desired application in the battery check menu screen by selecting a corresponding quit icon. Also, a 'multitasking' icon is displayed in the battery check menu screen. This icon is used for a return to the multi-tasking application menu screen.

As discussed heretofore, the mobile device 100 according to the third exemplary embodiment of the present invention may offer information about battery consumption for each application to a user in the application execution screen, the multi-tasking application menu screen and the battery check menu screen. In addition, the mobile device 100 may offer the application quit icon for a quick end of selected or all applications.

A fourth exemplary embodiment of the present invention relates to a method for providing a user interface that induces a user's walking and/or other exercise. This exemplary embodiment is applied to the mobile device 100 having a motion sensor unit (not shown) and a location-based communication module (not shown). This exemplary embodiment is described with reference to FIG. 8.

Figure 8:
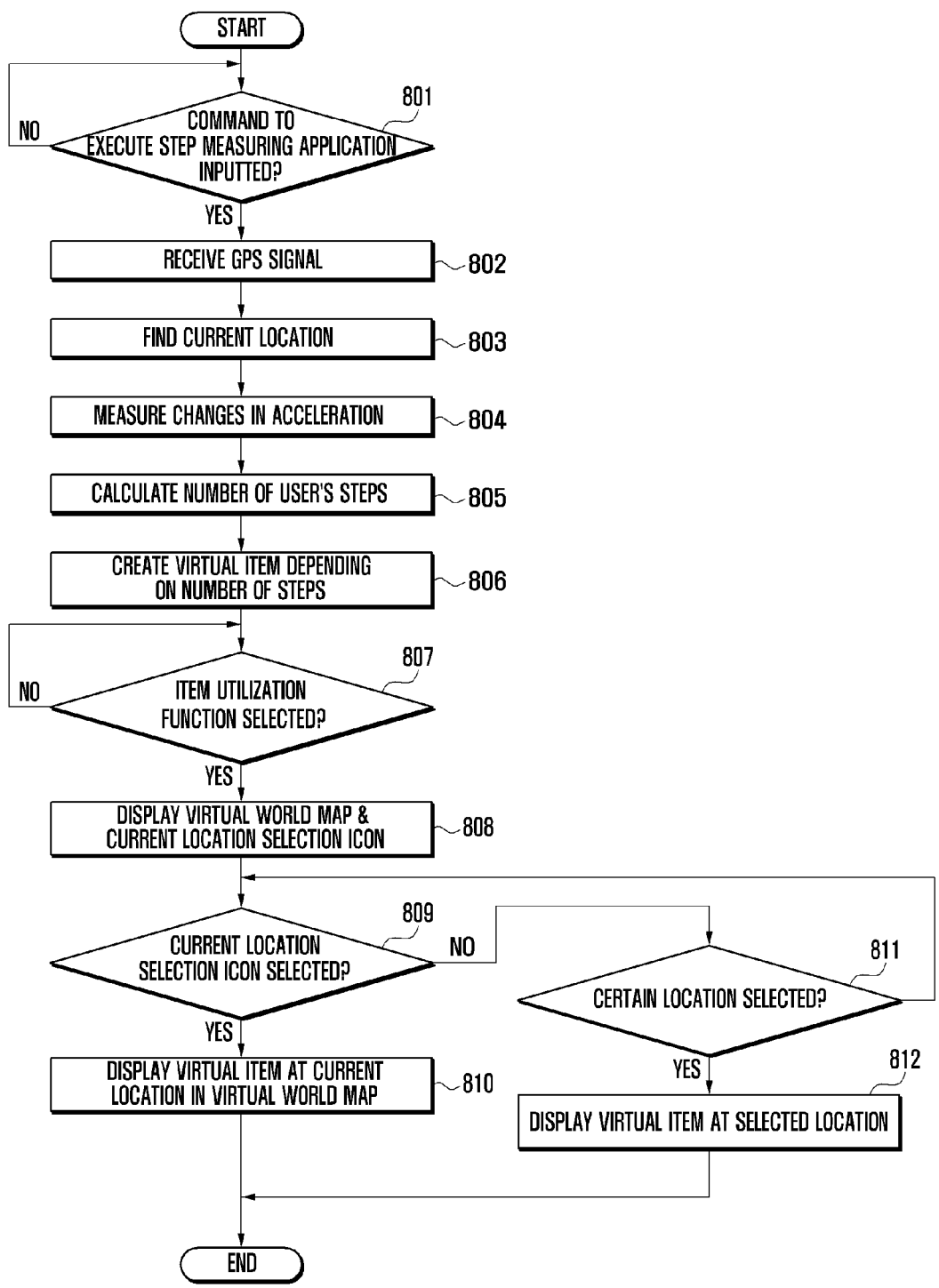
FIG. 8 is a flow diagram illustrating a method for providing an eco-friendly UI in accordance with a fourth exemplary embodiment of the present invention.

FIG. 8 is a flow diagram illustrating a method for providing an eco-friendly UI in accordance with the fourth exemplary embodiment of the present invention. The mobile device 100 in this exemplary embodiment includes a step measuring application which measures a number of a user's steps through the motion sensor unit and utilizes data about the measured number of steps. In the following description, it is assumed that the mobile device 100 has a GPS module as the location-based communication module and has an acceleration sensor as the motion sensor unit.

Referring to FIGS. 1 and 8, the control unit 160 determines whether a command to execute the step measuring application is inputted from the input unit 140 in step 801. If the execution command is inputted, the control unit 160 executes the step measuring application and receives a GPS signal from GPS satellites through the GPS module in step 802. Next, the control unit 160 finds a current location of the mobile device 100 through the received GPS signal in step 803. Then the control unit 160 measures changes in acceleration of the mobile device 100 through the acceleration sensor in step 804. Also, the control unit 160 calculates the number of user's steps from the measured changes in acceleration in step 805. The acceleration of the mobile device 100 changes suddenly whenever a user steps forward. Therefore, the control unit 160 can determine the number of the user's steps by identifying suddenly changed points of acceleration. Next, the control unit creates a virtual item corresponding to the number of user's steps in step 806. The virtual item may be a material, such as a fossil fuel or trees, for producing energy. After creating the virtual item, the control unit 160 enables the display unit 150 to display the virtual item. For instance, if the virtual item is a tree, the display unit 150 may display trees which may be conserved according to a user's walking exercise.

The size or kind of a tree may be varied according to the number of steps. The memory unit 130 may store data about the size or kind of a tree corresponding to the number of steps, and the control unit 160 may determine the size or kind of a tree to be displayed by checking data stored in the memory unit 130. Also, the control unit 160 may enable the display unit 150 to further display the number of user's steps, calories consumed by a user's walking and/or other exercise, a $CO_2$ reduction according to a user's walking and/or exercise, and the like.

Next, the control unit 160 determines whether an item utilization function is selected through the input unit 140 in step 807. The item utilization function may be a type of game application that utilizes the created virtual item.

If the item utilization function is selected, the control unit 160 enables the display unit 150 to display a virtual world map and a current location selection icon in step 808. For instance, an earth image may be represented as the virtual world map. Then the control unit 160 determines whether the current location selection icon is selected through the input unit 140 in step 809. If the current location selection icon is selected, the control unit 160 enables the display unit 150 to display the virtual item at the current location in the virtual world map in step 810. For instance, if a user is located at Seoul, the control unit 160 may enable the display unit 150 to display a tree image at Seoul in the earth image.

If the current location selection icon is not selected, the control unit 160 further determines whether a certain location is selected in the virtual world map through the input unit 140 in step 811. If any location is selected in the virtual world map, the control unit 160 enables the display unit 150 to display the virtual item at the selected location in step 812. For instance, if a user selects the Amazon in the earth image, the control unit 160 may enable the display unit 150 to display a tree image at the Amazon.

In an alternative exemplary embodiment, if the item utilization function is selected in the step 807, the control unit 160 may immediately perform step 810 to display the virtual item at the current location in the virtual world map.

In another exemplary embodiment, the control unit 160 may perform step 805 before performing the steps 802 and 803. Also, the control unit 160 may perform step 806 or step 808 before performing steps 802 and 803.

The virtual world map containing the virtual item may be used for the idle screen, etc. Therefore, a user can always recognize the number of the virtual items, and this may give a user a motivation for walking and/or exercising.

Meanwhile, the virtual item may be converted into a point and used as a means of payment for content purchase. In this case, the control unit 160 enables the RF unit 110 to access a content providing server and transmits data about the virtual item to the content providing server. Then the content providing server converts the received data into a corresponding point and returns it to the mobile device 100. Therefore, a user can purchase desired content with the received point.

Figure 9:
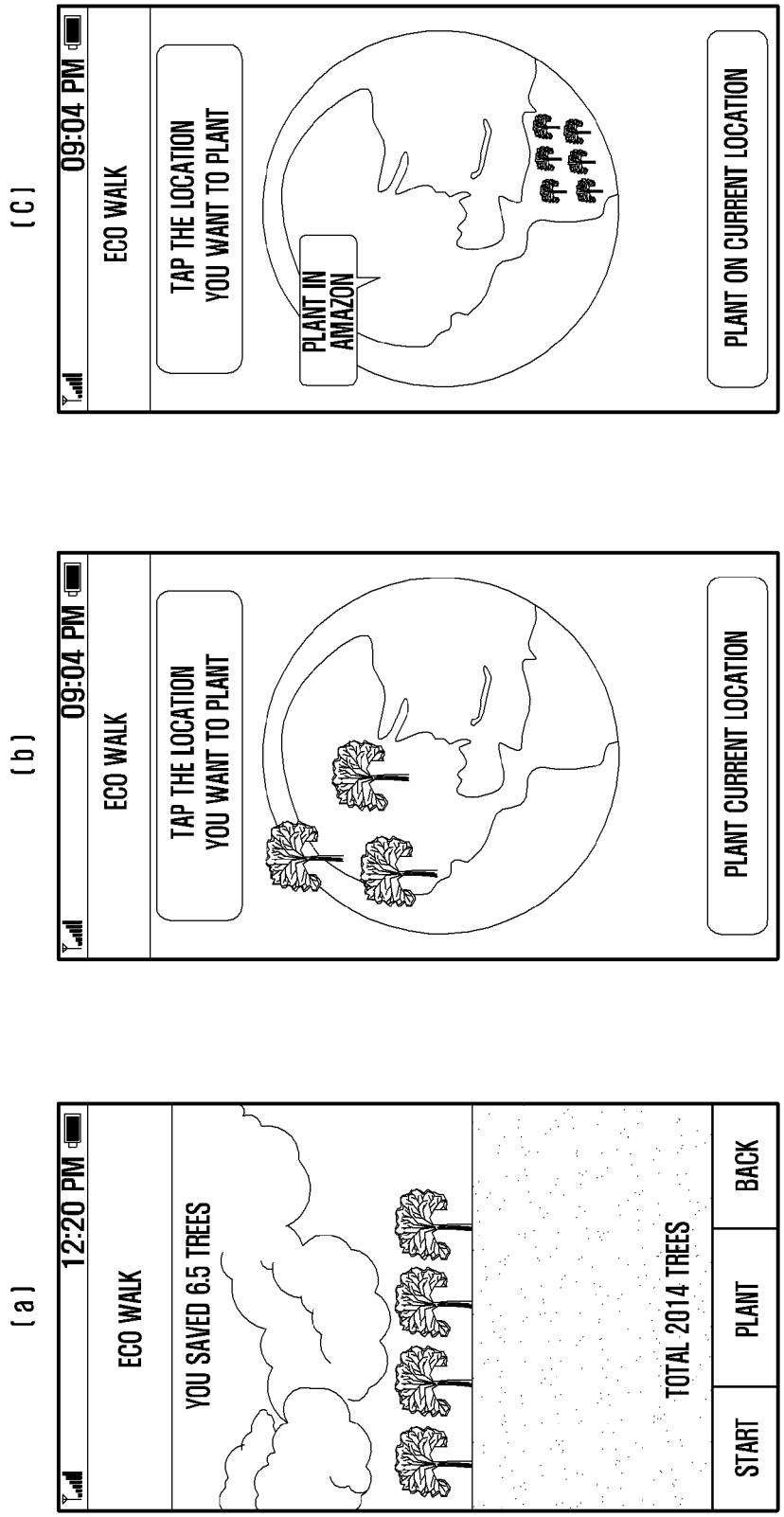
FIG. 9 is a screen view illustrating an eco-friendly UI provided by the method in accordance with the fourth exemplary embodiment of the present invention.

FIG. 9 is a screen view illustrating an eco-friendly UI provided by the method in accordance with the fourth exemplary embodiment of the present invention.

Referring to FIG. 9, screen view [a] shows an example of the execution screen of the step measuring application. As shown, this screen is composed of tree images and the number of trees expected to be saved by a walking and/or exercising. The number of trees includes the number of trees saved after the execution of the step measuring application and the total number of saved trees. Also, this screen further displays a 'plant' menu item.

Screen view [b] is offered when a user selects the 'plant' menu item. This screen view corresponds to the item utilization function screen discussed above. As shown, this screen contains an earth image and a 'plant current location' icon for selecting the current location. If this icon is selected when a user is located at Seoul, the control unit 160 may enable the display unit 150 to display a tree image at Seoul in the earth image. On the other hand, if a user selects any other location in the earth image, the control unit 160 may enable the display unit 150 to display a tree image at the selected location. Screen view [c] is offered when a user selects a location corresponding to the Amazon, and thus displays the text 'plant in Amazon'.

As discussed heretofore, the mobile device 100 according to the fourth exemplary embodiment of the present invention may offer functions to measure the number of user's steps, to create the virtual item according to the measured number of steps, and to utilize the created virtual item. In particular, the virtual item may be automatically displayed at a user's current location in the virtual world map. This exemplary embodiment may give a user motivation for a walking and/or exercising.

A fifth exemplary embodiment of the present invention relates to a method for providing a user interface that allows a user to continuously recognize environmental issues. This exemplary embodiment is applied to the mobile device 100 having a location-based communication module (not shown). This exemplary embodiment is described with reference to FIG. 10.

Figure 10:
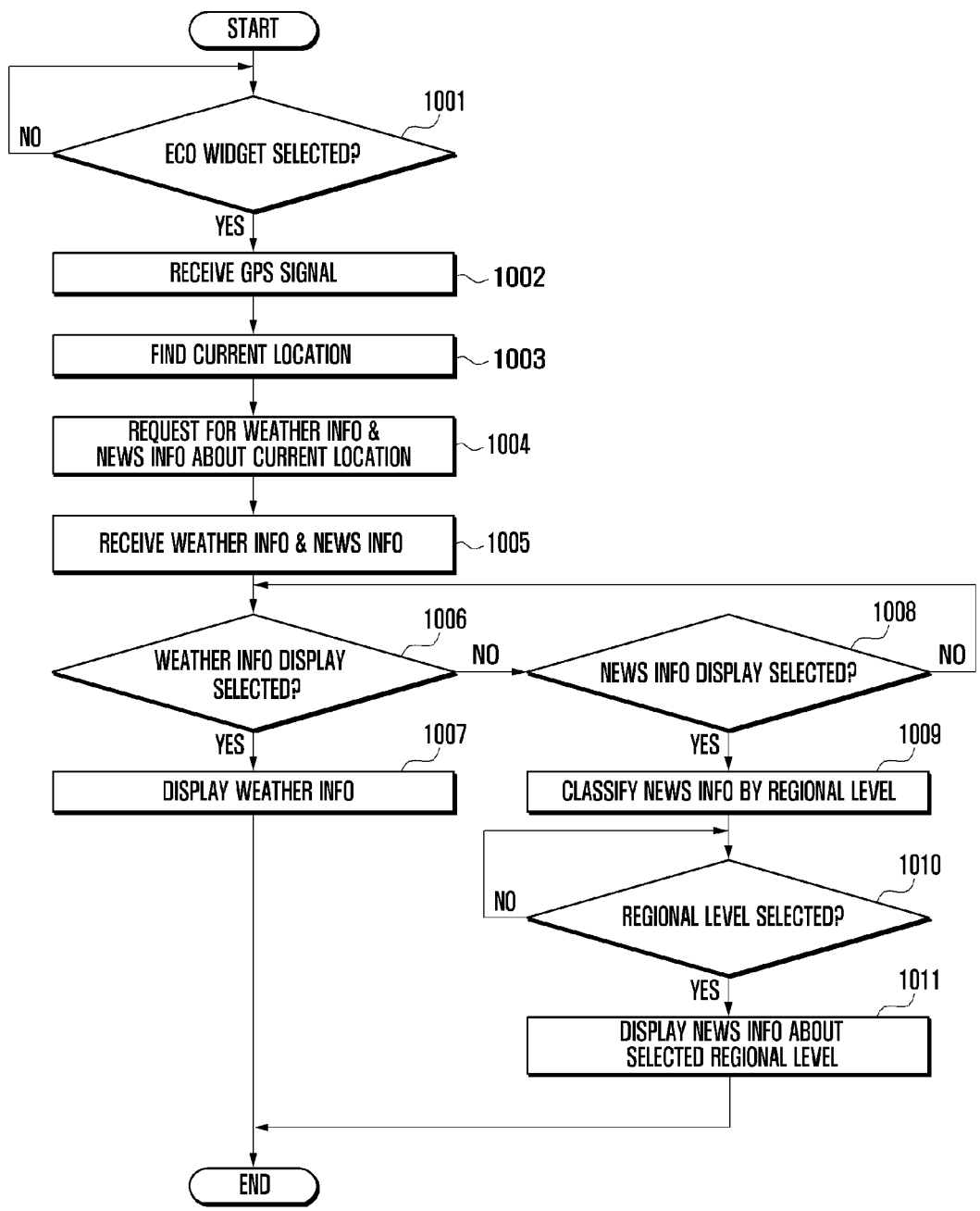
FIG. 10 is a flow diagram illustrating a method for providing an eco-friendly UI in accordance with a fifth exemplary embodiment of the present invention.

FIG. 10 is a flow diagram illustrating a method for providing an eco-friendly UI in accordance with the fifth exemplary embodiment of the present invention. In this exemplary embodiment, the mobile device 100 is configured to have an eco widget that is a certain graphic displayed on the idle screen and functions as an icon for the execution of an eco-friendly application. In the following description, it is assumed that the mobile device 100 has a GPS module as the location-based communication module.

Referring to FIGS. 1 and 10, the control unit 160 determines whether the eco widget is selected through the input unit 140 in step 1001. If the eco widget is selected, the control unit 160 executes a specific application corresponding to the eco widget and receives a GPS signal from GPS satellites through the GPS module in step 1002. Next, the control unit 160 finds a current location of the mobile device 100 through the received GPS signal in step 1003. Then the control unit 160 enables the RF unit 110 to access a web server or a Wireless Application Protocol (WAP) server and sends a request for weather information and for news information in connection with the current location to the server in step 1004. Alternatively, the control unit 160 may request only weather information or news information.

Then the control unit 160 receives weather information and new information in connection with the current location through the RF unit 110 in step 1005. Alternatively, the control unit 160 may receive only weather information or news information.

Next, the control unit 160 determines whether a weather information display is selected through the input unit 140 in step 1006. If the weather information display is selected, the control unit 160 enables the display unit 150 to display the received weather information in step 1007. In a case of receiving only weather information through the RF unit 110 in the step 1005, the control unit 160 may omit the step 1006 and perform the step 1007.

If the weather information display is not selected in the step 1006, the control unit 160 further determines whether a news information display is selected through the input unit 140 in step 1008. If the news information display is selected, the control unit 160 classifies the received news information according to regional levels in step 1009. Regions may have levels such as a country, a state, a city, a street, etc, and the received news information may be classified from the highest regional level to the lowest regional level. In this case, the control unit 160 may enable the display unit 150 to display such regional levels.

Next, the control unit 160 determines whether one of such regional levels is selected through the input unit 140 in step 1010. If one regional level is selected, the control unit 160 enables the display unit 150 to display the received news information about the selected regional level in step 1011. In a case of receiving only news information through the RF unit 110 in the step 1005, the control unit 160 may omit the steps 1006 and 1008 and perform the steps 1009 to 1011.

In a certain exemplary embodiment, the mobile device 100 may have a menu item for receiving weather or news information about other regions. In this case, the control unit 160 may offer a menu item for entering or selecting a regional name to the display unit 150. If a user enters or selects a desired regional name into or through the menu item, the control unit 160 enables the RF unit 110 to access a web server or a WAP server and sends the entered or selected regional name to the server. Then the control unit 160 receives weather or news information about the entered or selected regional name through the RF unit 110 and enables the display unit 150 to display the received weather or news information. At this time, the control unit 160 may classify the received weather or news information according to regional levels and selectively display it on the display unit 150.

Figure 11:
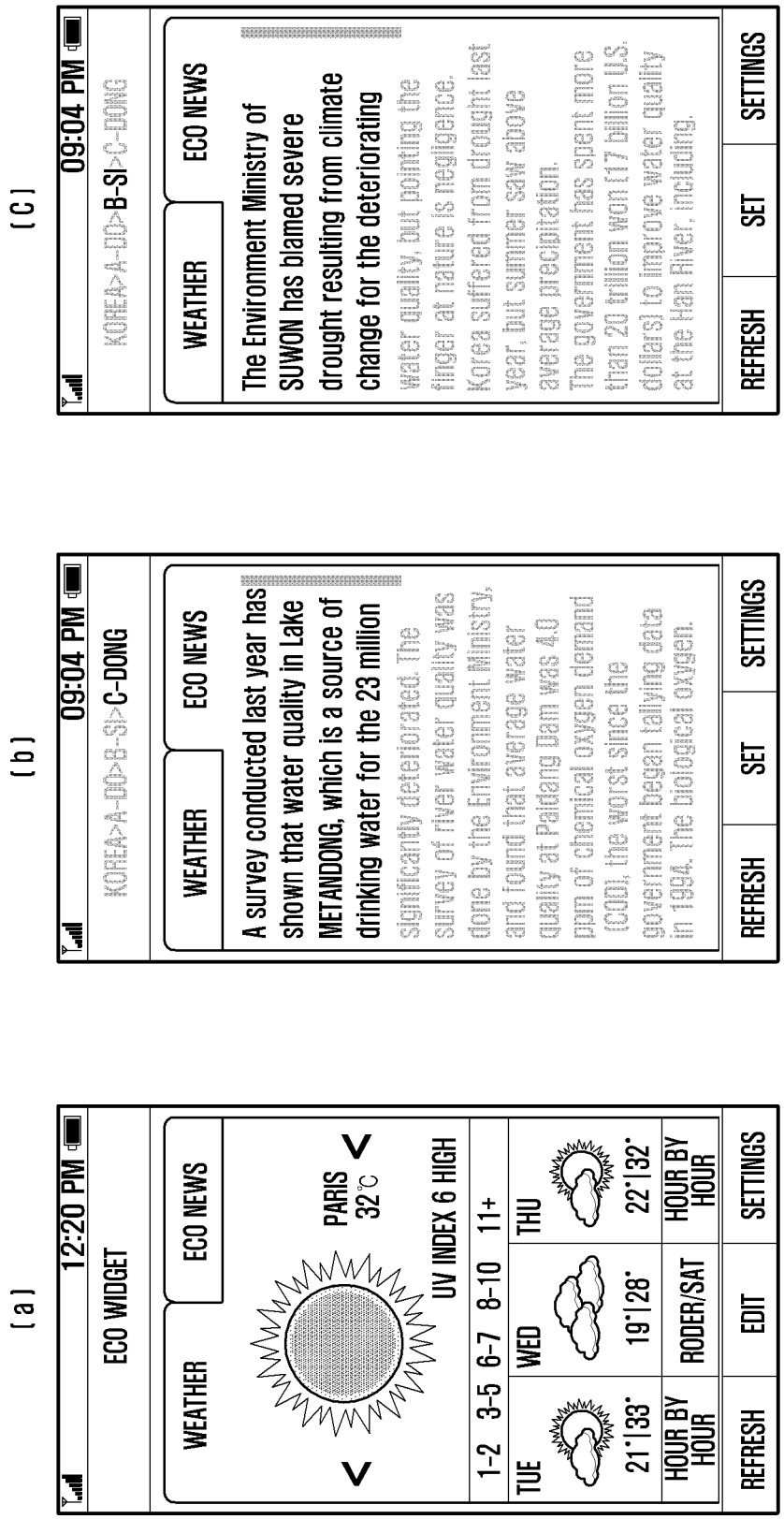
FIG. 11 is a screen view illustrating an eco-friendly UI provided by the method in accordance with the fifth exemplary embodiment of the present invention.

FIG. 11 is a screen view illustrating an eco-friendly UI provided by the method in accordance with the fifth exemplary embodiment of the present invention.

Referring to FIG. 11, screen view [a] shows an example of a screen on which weather information about a user's current location is displayed. As shown, this screen represents a weather condition, a temperature, an UltraViolet (UV) index, a week weather forecast, etc. Meanwhile, screen views [b] and [c] show two examples of a screen on which news information about a user's current location is displayed. In particular, screen view [b] shows news information about a relatively lower regional level (i.e., neighborhood), whereas screen view [c] shows news information about a relatively higher regional level (i.e., city).

In a certain exemplary embodiment, the mobile device 100 may offer information about environmental pollution to a user. In this case, the control unit 160 receives a GPS signal through the GPS module and thereby finds current location information about the mobile device 100. Then the control unit 160 enables the RF unit 110 to access a web server or a WAP server and sends a request for environmental pollution information about the current location to the server. Also, the control unit 160 receives environmental pollution information about the current location through the RF unit 110 and enables the display unit 150 to display the received environmental pollution information. Here, the environmental pollution information may include a local map containing the current location, environmental pollution states, concentrations of gases such as $O_3$, $CO_2$, and $SO_2$, or the like.

Also, the mobile device 100 may have a menu item for receiving environmental pollution information about other regions. In this case, the control unit 160 may offer a menu item for entering or selecting a regional name to the display unit 150. If a user enters or selects a desired regional name into or through the menu item, the control unit 160 enables the RF unit 110 to access a web server or a WAP server and sends the entered or selected regional name to the server. Then the control unit 160 receives environmental pollution information about the entered or selected regional name through the RF unit 110 and enables the display unit 150 to display the received environmental pollution information.

Figure 12:
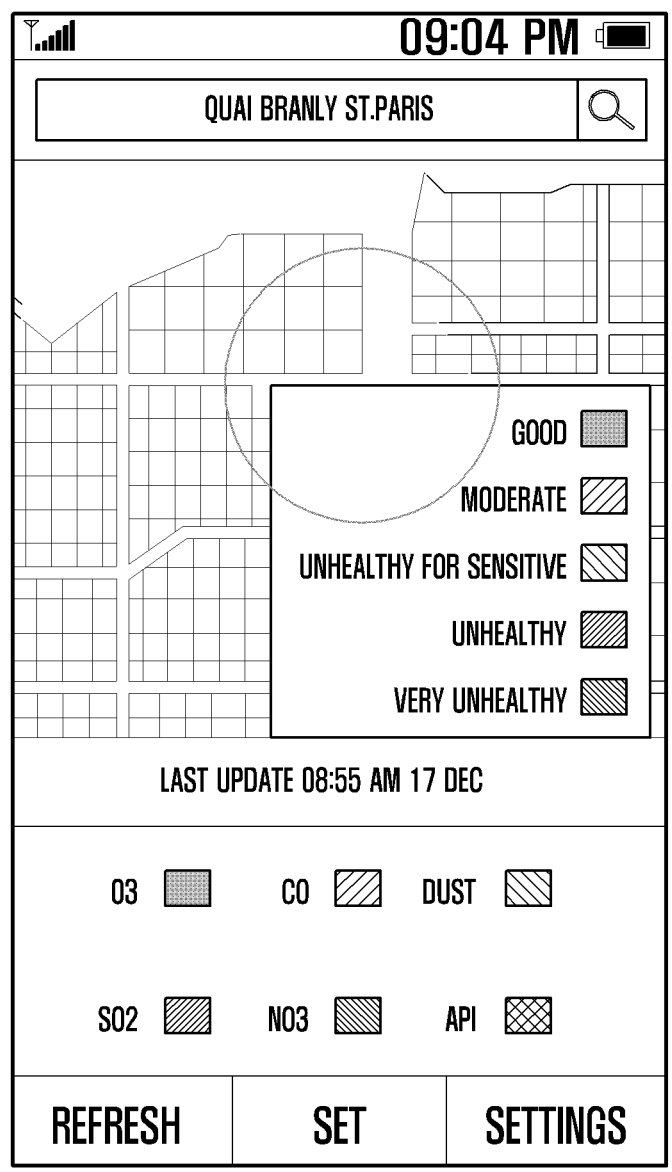
FIG. 12 is a screen view illustrating another eco-friendly UI provided by the method in accordance with the fifth exemplary embodiment of the present invention.

FIG. 12 is a screen view illustrating another eco-friendly UI provided by the method in accordance with the fifth exemplary embodiment of the present invention.

Referring to FIG. 12, a screen view shows a name of a current location ('Quaff Branly St. Paris') and a map image about the current location. Also, this screen includes levels of environmental pollution states such as 'good', 'moderate', 'unhealthy for sensitive', 'unhealthy', and 'very unhealthy' which are displayed with different colors. In addition, this screen further represents data about air pollutants such as $O_3$, $SO_2$, $CO_2$, $NO_3$, dust, Air Pollution Index (API), etc. Meanwhile, this screen may further offer a search window for searching environmental pollution information about other regions.

As discussed heretofore, the mobile device 100 according to the fifth exemplary embodiment of the present invention may offer weather information, news information, and environmental pollution information about a user's current location through a suitable widget. Also, such information may be differently offered according to regional levels. This exemplary embodiment allows a user to continuously recognize environmental issues.

While the present invention has been shown and described with reference to an exemplary embodiment thereof, it will be understood by those skilled in the art that various changes in form and details may be made therein without departing from the spirit and scope of the invention as defined by the appended claims and their equivalents.

What is claimed is:

1. A method for providing a user interface of a mobile device having a solar panel, the method comprising:
 measuring a recharging amount or time;
 displaying the recharging amount or time;
 determining whether the recharging amount or time is more than a predefined critical amount or time; and
 if the recharging amount or time is more than the critical amount or time, transitioning the mobile device into an executable state of a specific application,
 wherein the measuring of the recharging amount or time includes:
  performing a first battery level check to determine a first battery level of the mobile device;
  performing a second battery level check to determine a second battery level of the mobile device; and
  measuring the recharging amount or time by comparing the first battery level with the second battery level.

2. The method of claim 1, wherein power is cycled on the mobile device between the first battery level check and the second battery level check.

3. The method of claim 1, wherein the displaying of the recharging amount or time includes representing the recharging amount as a fossil fuel or tree image which is expressed together with the amount of a fossil fuel or trees that can be conserved by performing a solar charge.

4. A mobile device comprising:
 an input unit;
 a display unit;
 a solar panel for receiving solar energy and for converting the solar energy into electrical energy for charging a battery; and
 a control unit for measuring a recharging amount or time of the battery charged by the solar panel, for enabling the display unit to display the recharging amount or time, and if the recharging amount or time is more than a predefined critical amount or time, for transitioning the mobile device into an executable state of a specific application,
 wherein the control unit checks a first battery level of the mobile device, subsequently checks a second battery level of the mobile device, and measures the recharging amount by comparing the first battery level with the second battery level.

5. The mobile device of claim 4, wherein power is cycled on the mobile device between the first battery level check and the second battery level check.

* * * * *